United States Patent [19]

Morrow, Jr.

[11] 4,411,578
[45] Oct. 25, 1983

[54] SHUTTLE SPREADING CONVEYOR

[75] Inventor: Harold F. Morrow, Jr., Columbia, Pa.

[73] Assignee: Aggregates Equipment, Inc., Leola, Pa.

[21] Appl. No.: 306,095

[22] Filed: Sep. 25, 1981

[51] Int. Cl.³ .............................................. B65G 65/32
[52] U.S. Cl. .................................... 414/300; 198/637
[58] Field of Search .............. 414/268, 269, 271, 272, 414/293, 301, 302, 523; 193/32; 198/586, 599, 637

[56] References Cited

U.S. PATENT DOCUMENTS 2,837,194  6/1958  Ross ..................................... 193/32
3,774,785 11/1973  Gasseling ........................ 414/300 X Primary Examiner—Robert G. Sheridan
Attorney, Agent, or Firm—Martin Fruitman

[57] ABSTRACT

An improved conveyor system with a leveling device for preventing the accumulation of material into distinct ridges at the top of the discharge pile and thus increasing the storage capacity of bins. A pivoting drag device is hung from the undercarriage of a shuttle conveyor so that, as the conveyor is moved across the material, the drag knocks the tops off the previously formed ridges and provides room for storage of material to a greater height.

4 Claims, 3 Drawing Figures

SHUTTLE SPREADING CONVEYOR

SUMMARY OF THE INVENTION

This invention deals generally with conveyors and more specifically with shuttle conveyors which are conveyors in which the entire conveyor moves transverse to the direction of material motion in order to discharge material over a wide area.

When such shuttle conveyors are used in conjunction with a movable plow to discharge material into bins, there is a tendency to form a pattern of ridges on the top of the discharge pile.

This pattern is partly the result of the plow's action in discharging material off of one or both sides of the conveyor as the plow progresses down the length of the conveyor. The plow movement, thus causes a ridge or ridges to form on the top of the pile in a direction parallel to the motion of the plow and the material on the conveyor.

If, instead, the plow is held stationary and the shuttle is moved transverse to the conveyor motion, the ridges are formed in a direction transverse to the motion of the belt. Similarly, if both the plow and the shuttle are moved simultaneously, the ridges are aligned at an angle to the motion of the conveyor.

Regardless of the direction of the ridges, they invariably form, and, because the ridge height limits the accumulation of material in the bin while real storage capacity still exists in the valleys between the ridges, the phenomenon prevents full utilization of storage bins under shuttle conveyors. Moreover, in subsequent processes which are affected by surface exposure to air, the ridges substantially increase the top surface and can affect such a process unpredictably.

The severity of the problem caused by the ridges varies with the material being handled, since the more friction and the higher angle of repose the material has, the higher the ridges become.

The present invention overcomes the problems associated with the ridges on the top of the material bin and does so without the addition of complex and costly equipment.

In the present invention a scraper or drag leveler apparatus is hung from the undercarriage of the shuttle conveyor so that, as the shuttle moves back and forth across the top of the bin, the leveler contacts the tops of the ridges and pushes them into the intermediate valleys.

This drag leveler is pivoted so that, as the shuttle reverses its direction, the leveler also swings to reverse itself, hitting each ridge while its lower edge trails the pivot slightly, acting as a drag leveler rather than as a scoop. Two limiting stops are, however, installed near the pivot point, to present the leveler from being lifted completely by the ridges and thereby causing it to simply ride over each ridge. This problem is also counteracted by designing the drag with sufficient weight so that the vector force from the movement across the ridge is less than the force required to remove the peak of the ridge.

The result of the present invention is full utilization of the storage capacity of the bin by assuring that the top surface of the material stored is virtually level.

DETAILED DESCRIPTION OF THE INVENTION

Figure 1:
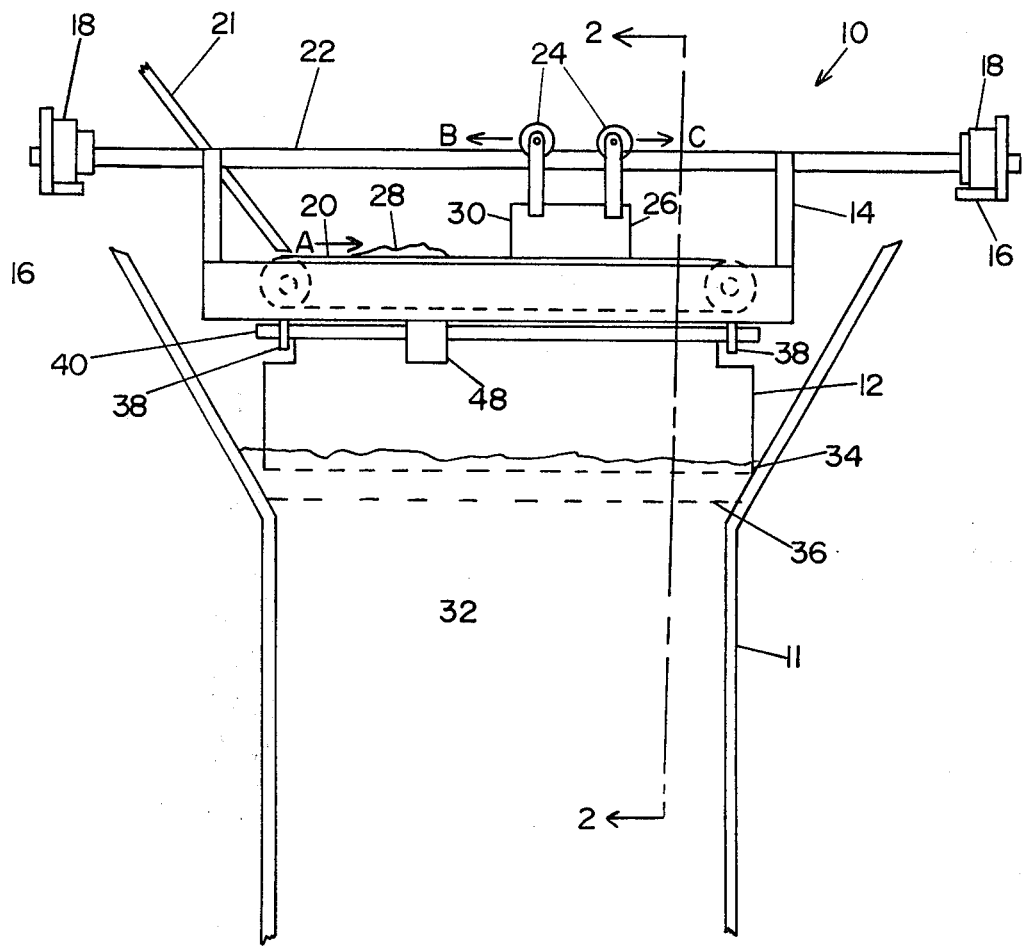
FIG. 1 is a simplified side view showing the preferred embodiment of the drag leveler hung beneath a conveyor.

FIG. 1 depicts the preferred embodiment of the invention in which conveyor system 10, located above material bin 11, includes drag leveler 12. Conveyor system 10 includes a shuttle trolley 14 carried upon rails 16 by wheels 18. Belt conveyor 20 is fed from chute 21 and is mounted upon shuttle 14 and is thus transported in the direction into the plane of the paper and transverse to belt motion direction A.

Shuttle 14 is attached to wheels 18 by crossbeam 22 which also acts as a track for wheels 24 which support belt plow 26. Belt plow 26 can therefore be moved in directions B or C along the length of belt conveyor 20. As material 28 on belt conveyor 20 comes into contact with belt plow 26 whose leading surface 30 is the apex of a structure which is angled to the direction of belt motion, material 28 is urged sidewards off of conveyor belt 20 and into material pile 32 in material bin 11.

In order to distribute material throughout entire bin 11, the typical operation of such a system includes motive means (not shown) to regularly move belt plow 26 the length of belt conveyor 20 alternately in directions B and C, while shuttle 14, moved upon tracks 16 by motive means (not shown), traverses the other dimension (into the paper) of bin 11. The result of this combined motion is the creation of a pattern of ridges 34 and valleys 36 on the top surface of material 32 in bin 11. It is these ridges and valleys that drag leveler 12 equalizes.

Drag leveler 12, in the preferred embodiment of FIG. 1, is constructed of sheet material, such as metal, plastic or rubber, is attached to shuttle 14 by hangers 38 and pivot 40, and has sufficient weight to move material 32 from the ridges into the valleys.

Figure 2:
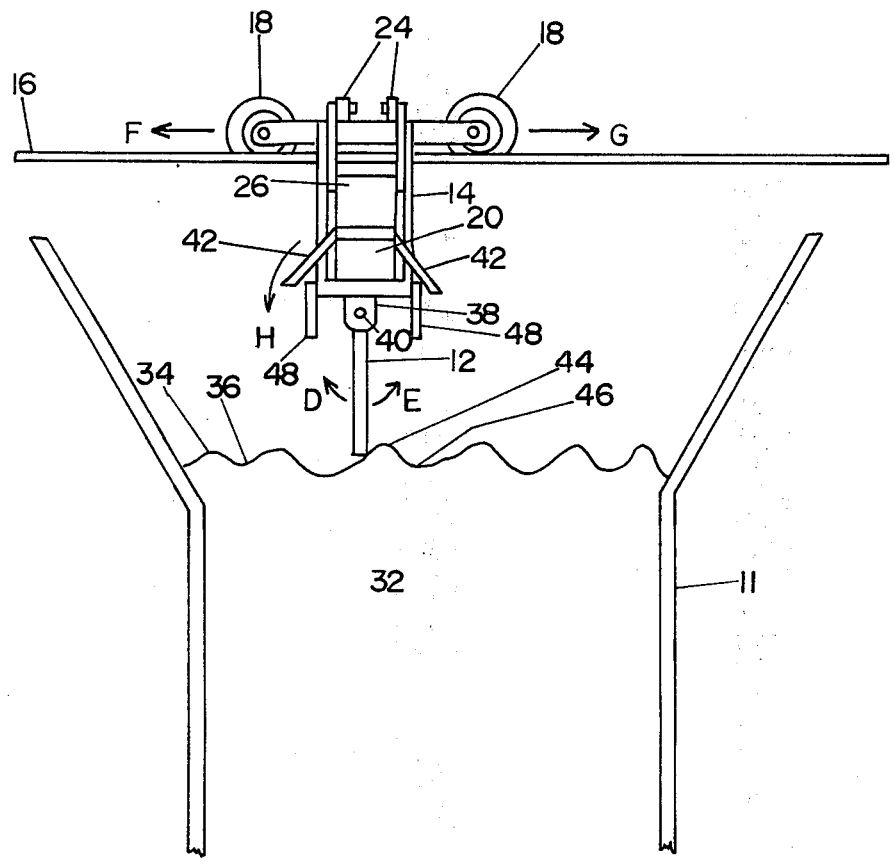
FIG. 2 is a simplified view through section 2—2 of FIG. 1.

As shown with better clarity in FIG. 2, which is a section of FIG. 1 taken at plane 2—2 and in which all parts have the same number designations, drag leveler 12 can then swing in directions D and E as shuttle trolley 14 moves in directions F and G. As seen in FIG. 2, belt plow 26 diverts material from belt conveyor 20, and the material falls onto shields 42 and then into bin 11 to form ridges 34 and valleys 36, as indicated by path H. However, as shuttle trolley 14 moves in direction G drag leveler 12 will contact ridge 44 and pull it into adjacent valley 46. As the surface level of material 32 rises higher in bin 11, drag leveler 12 will be required to travel at more and more of an angle to the vertical. Stops 48 are attached to shuttle trolley 14 in order to limit the angular displacement of drag leveler 12, and therefore permit reversal of the angle as shuttle trolley reverses its motion.

Figure 3:
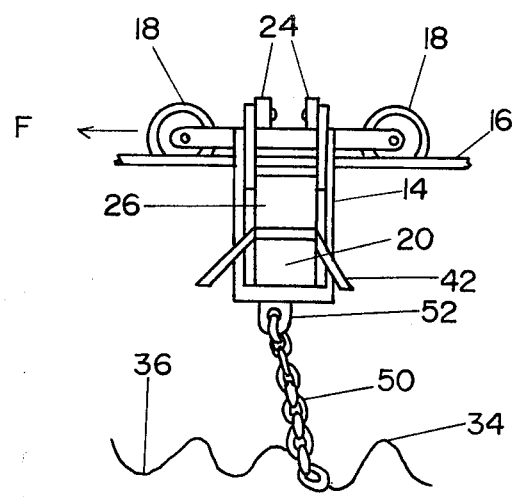
FIG. 3 is a simplified end-on view of an alternate embodiment of the invention using chains as a drag leveler.

FIG. 3 depicts an alternate embodiment of the invention in which chains 50 are substituted for drag leveler 12. Multiple lengths of chain 50 are hung in an array from several connectors 52 over the entire length of shuttle trolley 14, in the direction perpendicular to the paper in FIG. 3, thus forming an effective drag leveler with many independent elements. Since chains 50 are all free swinging and contain multiple links, no stops are needed to permit reversal of motion, and the chains will permit a material surface height essentially as high as shuttle trolley 14.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

For example, the conveyor upon which the drag leveler is used need not be a belt conveyor, but could be a chain conveyor or even a gravity fed slide, and an unloading device other than a belt plow could also be used. Moreover, the material need not be contained in a bin, but could be in an uncontained pile, since ridges and valleys would also form in such a situation and limit the useful height of the pile.

What is claimed as new and desired to be secured by Letters Patent of the United States is:

1. In a shuttle conveyor in which a movable trolley supports and transports a conveyor with means for unloading the conveyor at multiple points along its length, the improvement comprising:
   a free swinging drag leveler hung below and attached to the trolley, extending essentially the entire length of the conveyor, and of a weight sufficient so that, as the drag leveler is pulled forward by the shuttle conveyor, its lower edge trails behind that conveyor and when the drag leveler contacts a ridge of the surface of discharged material below the trolley, the drag leveler will pull the ridge of material into an adjacent valley.

2. The improvement for a shuttle conveyor as in claim 1 wherein the drag leveler consists of sheet material.

3. The improvement for a shuttle conveyor as in claim 1 wherein the drag leveler consists of an array of multiple chain lengths.

4. The improvement for a shuttle conveyor as in claim 1 wherein stops are attached to the trolley to limit the angle to the vertical which drag leveler may attain.

* * * * *